United States Patent [19]

Ooyama et al.

[11] Patent Number: 5,623,851
[45] Date of Patent: Apr. 29, 1997

[54] TRANSMISSION FOR ELECTRIC VEHICLE

[75] Inventors: Kazuo Ooyama; Masahiro Imamura; Makoto Kojima, all of Saitama, Japan

[73] Assignee: Honda Giken Kogyo Kasbushiki Kaisha, Tokyo, Japan

[21] Appl. No.: 453,713

[22] Filed: May 30, 1995

[30] Foreign Application Priority Data

May 27, 1994 [JP] Japan .................................. 6-115718

[51] Int. Cl.⁶ .................................................. F16H 3/08
[52] U.S. Cl. ......................... 74/333; 74/331; 74/810.1
[58] Field of Search ............................... 74/325, 331, 333, 74/336 R, 368, 810.1

[56] References Cited

U.S. PATENT DOCUMENTS

| | | | |
|---|---|---|---|
| 4,410,071 | 10/1983 | Osterman | 477/4 |
| 4,423,794 | 1/1984 | Beck | 477/3 X |
| 4,584,891 | 4/1986 | Mori | 74/333 X |
| 5,079,965 | 1/1992 | Leber et al. | 74/325 X |
| 5,395,293 | 3/1995 | Matsuura et al. | 477/15 |
| 5,400,670 | 3/1995 | Yamatani et al. | 74/336 R |
| 5,415,603 | 5/1995 | Tuzuki et al. | 477/5 |
| 5,425,283 | 6/1995 | Wehking | 74/331 |
| 5,427,196 | 6/1995 | Yamaguchi et al. | 180/55.6 X |
| 5,469,754 | 11/1995 | Sakai et al. | 74/336 R |
| 5,501,292 | 5/1996 | Kawashima et al. | 180/65.1 X |

FOREIGN PATENT DOCUMENTS 486415  1/1973  Japan .

*Primary Examiner*—Charles A. Marmor
*Assistant Examiner*—Peter Kwon
*Attorney, Agent, or Firm*—Lyon & Lyon

[57] ABSTRACT

A transmission for an electric vehicle that allows forward movement in a first shift stage with hydraulic pressure failure and permits forward and rearward towing. The first shift stage of the transmission T is established by a main first-shift gear 19 which is brought into and out of engagement with a main shaft Sm connected to an electric motor Mm through a towing clutch 50, and by a counter first-shift gear 26 carried on a counter shaft Sc with one-way clutch 47 interposed therebetween. During backward towing of the vehicle, the rotation of a driven wheel is reversely transmitted by way of the counter shaft Sc, the one-way clutch 47, and the counter first-shift gear 26 to the main first-shift gear 19, but by actuating the towing clutch 47 into a disengaged state to disengage the main first-shift gear 19 from the main shaft Sm, the electric motor Mm can be prevented from being forcibly driven and being damaged.

13 Claims, 7 Drawing Sheets

First shift (engagement)

FIG. 7A

Second and third shifts (non-engagement)

Reverse (non-engagement)

Forward towing (non-engagement)

FIG. 7D

Backward towing (engagement)

FIG. 7E

TRANSMISSION FOR ELECTRIC VEHICLE

BACKGROUND OF INVENTION

1. Field of the Invention

The present invention relates to a transmission for an electric vehicle, including a one-way clutch capable of being brought into an engaged state to establish a starting shift stage in a power transmitting path between an input shaft and an output shaft in order to transmit a driving force from a reversible electric motor through a preselected shift stage established in the power transmitting path, and a shifting clutch capable of being brought into an engaged state to establish a shift stage other than the starting shift stage.

2. Description of the Prior Art

Such a transmission for an electric vehicle is already known from Japanese Patent Application Laid-open No. 6415/73. In the above known transmission for the electric vehicle, a first shift stage at the starting of the vehicle is established by the one-way clutch without use of the shifting clutch and hence, it is not necessary to continue the driving of a hydraulic pump during stoppage of the vehicle in order to bring the shifting clutch into the engaged state.

However, for example, when a vehicle including the above known transmission for the electric vehicle is towed backwardly, the one-way clutch is brought into the engaged state, causing the rotation of a driven wheel to be transmitted reversely to the electric motor, as described in the description of the preferred embodiment. If the electric motor is forcibly driven from the outside in this manner, there is a possibility that the electric motor itself is damaged, or the electric motor functions as a dynamo to adversely affect the electric equipment.

SUMMARY OF THE INVENTION

Accordingly, it is an object of the present invention to prevent the rotation of the driven wheel from being reversely transmitted to the electric motor through the one-way clutch, for example, when the electric vehicle is towed backwardly.

To achieve the above object, according to the present invention, there is provided a transmission for an electric vehicle, comprising a one-way clutch capable of being brought into an engaged state to establish a starting shift stage in a power transmitting path between an input shaft and an output shaft in order to transmit a driving force from a reversible electric motor to a driven wheel through a preselected shift stage established in tile power transmitting path, and a shifting clutch capable of being brought into an engaged state to establish a shift stage other than the starting shift stage, wherein the transmission further includes a clutch means provided in the power transmitting path for disengaging at least one of gears used for establishing the starting shift stage from the input shaft or the output shaft.

With the above construction, it is possible to reliably avoid the disadvantage that the rotation of the driven wheel is reversely transmitted to the electric motor.

If the one gear is disengaged from the input shaft or the output shaft by the clutch means during backward towing of the vehicle, it is possible to reliably avoid the disadvantage that the rotation of the driven wheel is reversely transmitted to the electric motor during backward towing of the vehicle.

If a backward shift stage is mounted in another system independently from the starting shift stage, the vehicle can be moved backwardly without use of a starting shift stage with a one-way clutch incorporated therein.

A driving gear for the starting shift stage, relatively rotatably carried on the input shaft may be meshed with a follower gear for the starting shift stage, relatively rotatably carried on the output shaft. The either one of the clutch means or the one-way clutch may be disposed between the input and the driving gear, and the other of the clutch means and the one-way clutch may be disposed between the output shaft and the follower gear. With such construction, the clutch means and the one-way clutch can be disposed in a compact manner without any interference with each other.

The above and other object, features and advantages of the invention will become apparent from the following description of the preferred embodiment in conjunction with the accompanying drawings.

DESCRIPTION OF THE PREFERRED EMBODIMENT

Figure 1:
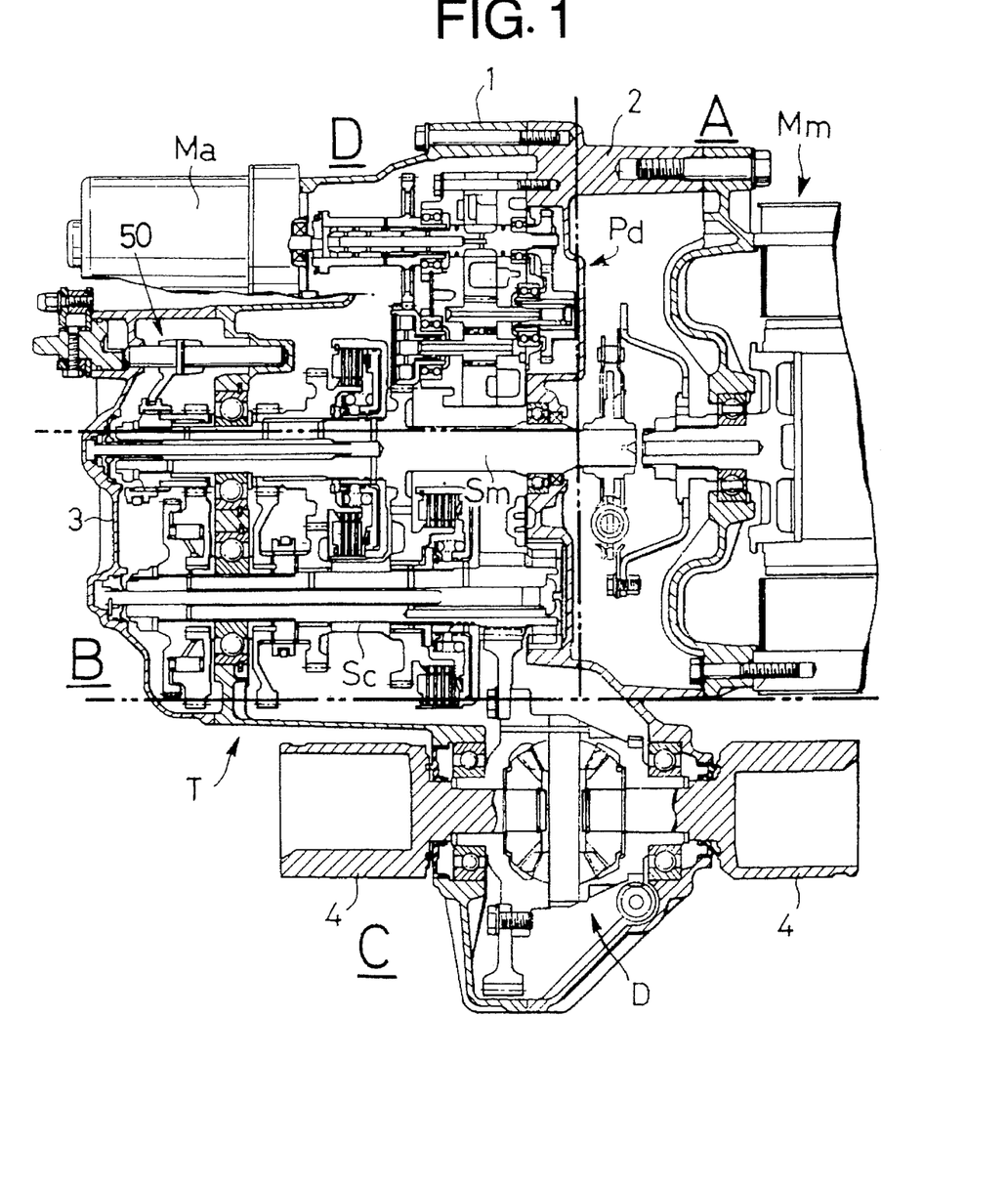
FIG. 1 is a sectional view of a transmission according to an embodiment of the present invention.

Referring to FIG. 1, a transmission T for an electric vehicle includes a left casing 1 and a right casing 2 which are coupled to each other at a split face extending in a longitudinal direction of a vehicle body. A left cover 3 is coupled to an opening at the left end of the left casing 1, and a traveling main motor Mm is supported at an opening at the right end of the right casing 2. A main shaft Sm coaxial with an output shaft of the main motor Mm and a counter shaft Sc parallel to the main shaft Sm are supported in the left and right casings 1 and 2. Further, left and right axles 4, 4 are supported below the counter shaft Sc by left and right casings 1 and 2 with a differential D interposed between the axles 4. An oil pump driving device Pd is provided in front of the main shaft Sm and includes an assist motor Ma.

Figure 2:
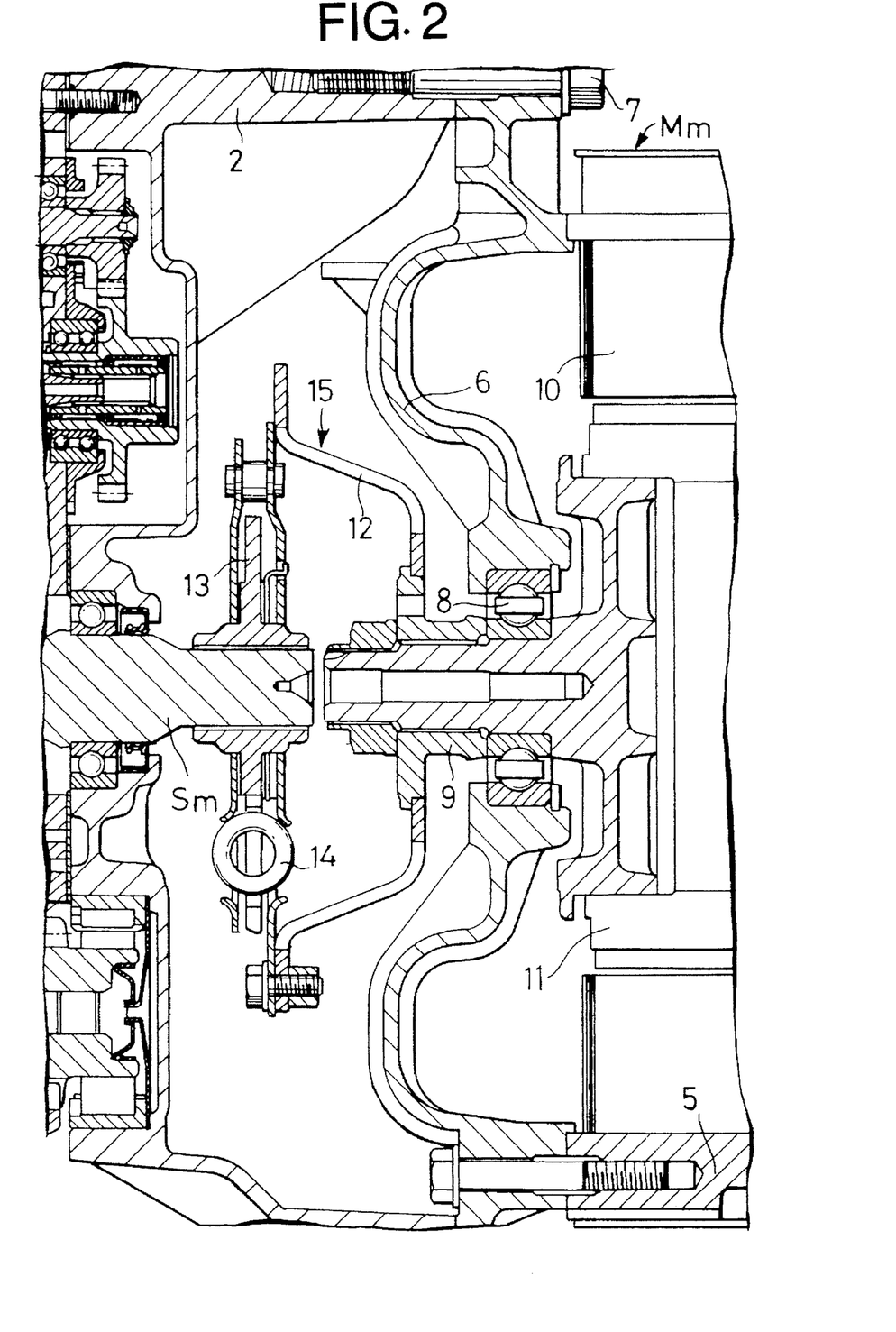
FIG. 2 is an enlarged view of a portion of the transmission of FIG. 1 as indicated by A.

As can be seen from FIG. 2, the main motor Mm includes a front cover 6 which covers an opening at a front end of a cylindrical motor casing 5. The main motor Mm is fixed to the right casing 2 by a bolt or bolts 7 passing through the front cover 6. An output shaft 9 is supported on the front cover 6 by a ball bearing 8 interposed therebetween, and includes a rotor 11 opposed to a stator 10 mounted on an inner periphery of the motor casing 5. A left end of the output shaft 9 is coaxially opposed to a right end of the main shaft Sm. The left end of the output shaft 9 and the right end of the main shaft Sm are coupled to each other by a damper 15 having a first mass 12 coupled to a second mass 13 by a spring 14.

Figure 3:
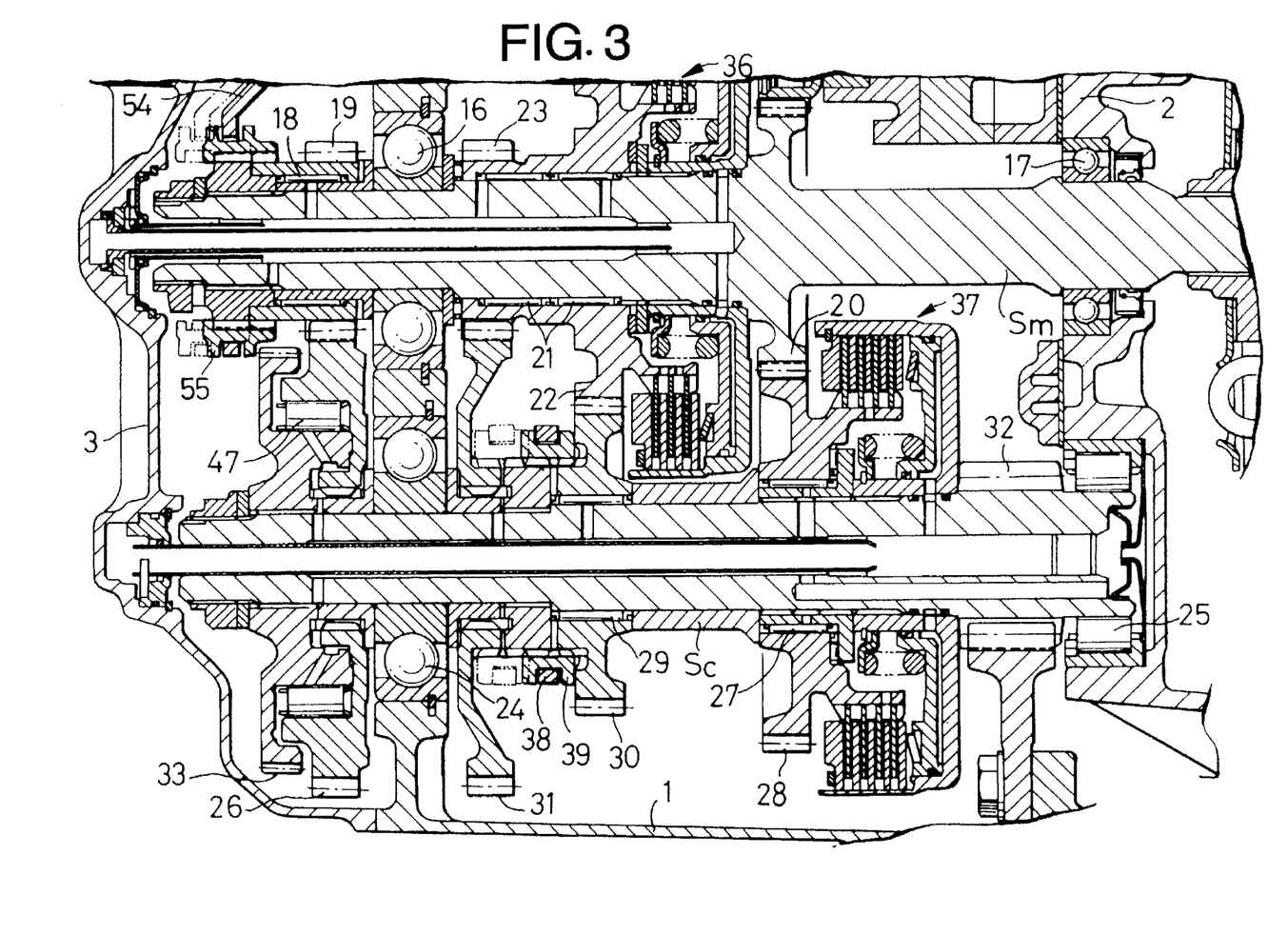
FIG. 3 is an enlarged view of a portion of the transmission of FIG. 1 as indicated by B.

As can be seen from FIG. 3, the main shaft Sm is supported on the left and right casings 1 and 2 by a pair of ball bearings 16 and 17 interposed therebetween. A main first-shift gear 19 is supported on the main shaft Sm by a needle bearing 18 interposed therebetween, a main second-shift gear 20 is integral with the main shaft Sm, and a main third-shift gear 22 is supported on the main shaft Sm by a needle bearing 21. A main reverse gear 23 is integrally formed on the main third-shift gear 22.

The counter shaft Sc is supported on the left and right casings 1 and 2 by a ball bearing 24 and a roller bearing 25 interposed therebetween. A counter first-shift gear 26 is relatively rotatably carried on the counter shaft Sc and is meshed with the main first-shift gear 19, a counter second-shift gear 28 is carried on the counter shaft Sc by a needle bearing 27 interposed therebetween and is meshed with the main second-shift gear 20, a counter third-shift gear 30 is carried on the counter shaft Sc by a needle bearing 29 interposed therebetween and is meshed with the main third-shift gear 22, and a counter reverse gear 31 is relatively rotatably carried on the counter shaft Sc and is meshed with the main reverse gear 23. The counter first-shift gear 26 is carried on an outer periphery of a parking gear 33 spline-coupled to the counter shaft Sc through a one-way clutch 47. A final drive gear 32 is integrally formed at the right end of the counter shaft Sc.

The main third-shift gear 22 and the main reverse gear 23, relatively rotatably carried on the main shaft Sm, are capable of being brought into engagement with the main shaft Sm through a third-shift reverse clutch 36.

The counter second-shift gear 28, relatively rotatably carried on the counter shaft Sc, is capable of being brought into engagement with the counter shaft Sc through a second-shift clutch 37. The counter third-shift gear 30 and the counter reverse gear 31 are capable of being selectively brought into engagement with the counter shaft Sc through a shift piece 39 which is operated by a shift fork 38.

Figure 4:
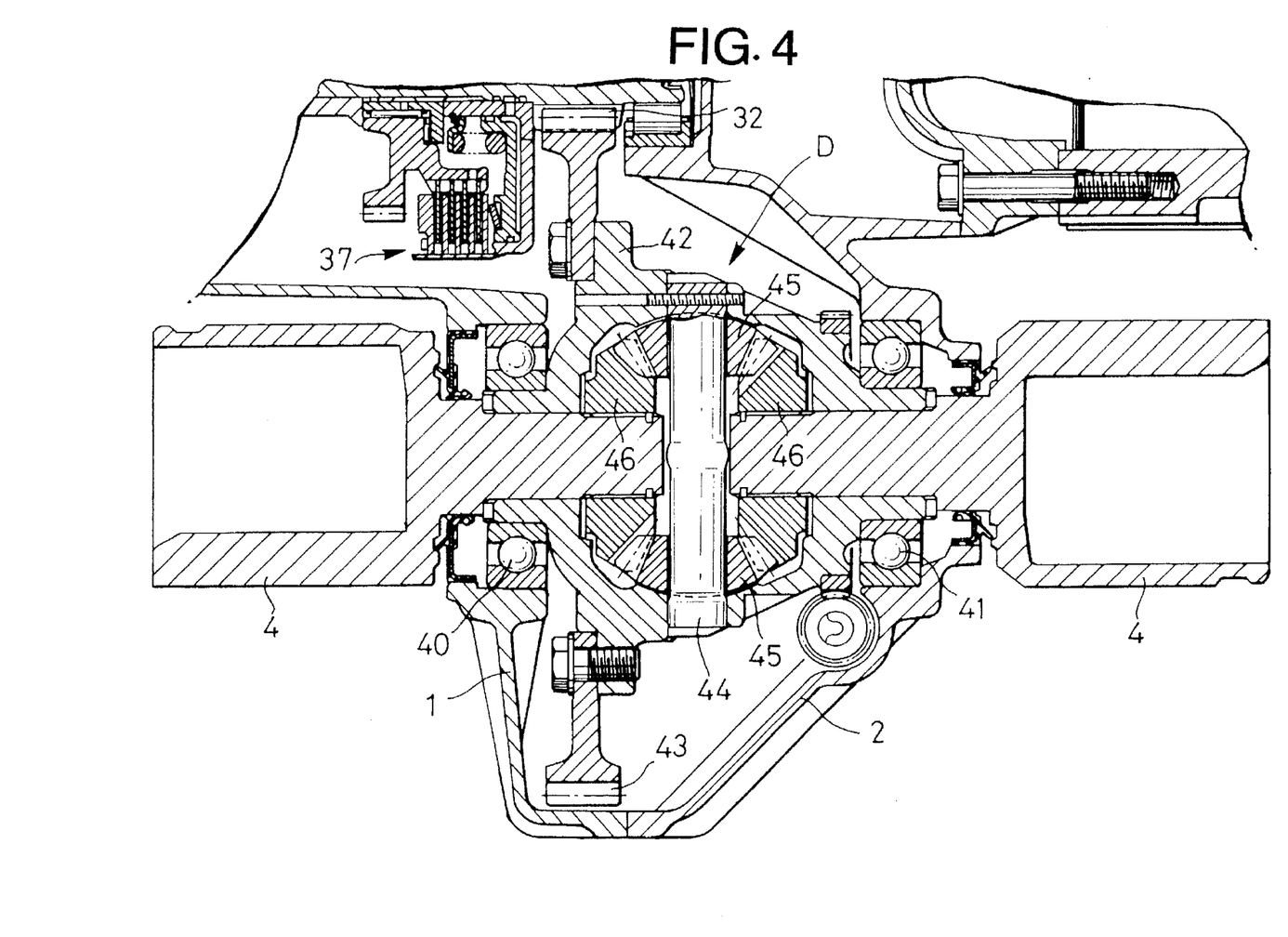
FIG. 4 is an enlarged view of a portion of the transmission of FIG. 1 indicated by C.

As can be seen from FIG. 4, a differential case 42 is supported on the left and right casings 1 and 2 by a pair of ball bearings 40 and 41 interposed therebetween, and includes a final driven gear 43 meshed with the final drive gear 32. A pair of differential pinions 45, 45 are provided on a pinion shaft 44 extending through the differential case 42, and are meshed with a pair of differential side gears 46, 46 which are provided on inner ends of the left and right axles 4, 4.

Figure 5:
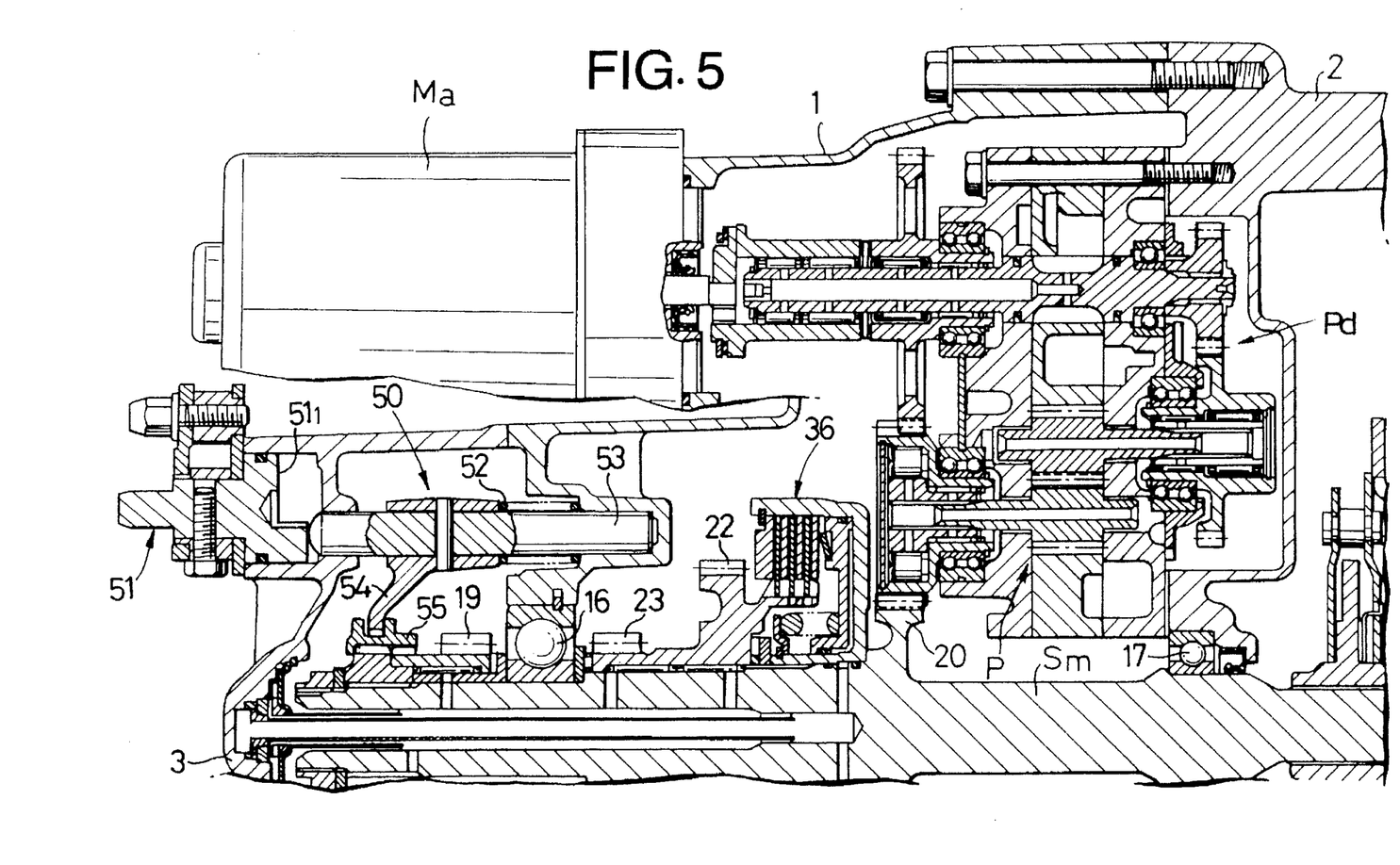
FIG. 5 is an enlarged view of a portion of the transmission of FIG. 1 as indicated by D.

As can be seen from FIG. 5, a towing clutch 50 for disengaging the main first-shift gear 19 from the main shaft Sm for towing the vehicle backwardly includes a cam member 51 rotatably carried on the left cover 3 and rotatively driven from outside of the transmission T through a Bowden cable (not shown), a clutch rod 53 slidably carried on the left cover 3 and the left casing 1 and biased by a spring 52 in a direction to abut against the cam face $51_1$ formed on an end face of the cam member 51, a clutch fork 54 fixedly mounted on the clutch rod 53, and a slide piece 55 engaged by the clutch fork 54 for sliding movement in an axial direction of the main shaft Sm to bring the main first-shift gear 19 into and out of engagement with the main shaft Sm.

In a vehicle using an internal combustion engine as a traveling drive source, the direction of rotation of the engine is constant, and even during stoppage of the vehicle, the engine is being rotated and hence, an oil pump P is normally being driven. In an electric vehicle, however, the direction of rotation of the main motor Mn is reversed between the forward movement and the backward movement, as described above, and moreover, the main motor is stopped when the vehicle is stopped. For this reason, when the main motor Mn is either stopped and reversed, the oil pump 17 is driven by the oil pump driving device Pd including the assist motor Ma shown in FIG. 5. The description of the detail of the oil pump driving device Pd is omitted as not being part of this invention.

The third-shift reverse clutch 36, the second-shift clutch 37 and the shift piece 39 are electrically controlled in a conventional manner by an electronic control unit (not shown) to which signals from an accelerator pedal opening degree sensor (not shown) for detecting an opening degree of an accelerator pedal and a vehicle speed Sensor (not shown) for detecting a vehicle speed are supplied.

The operation of the transmission T having the above-described construction will be described primarily with reference to FIGS. 6 and 7.

Figure 6:
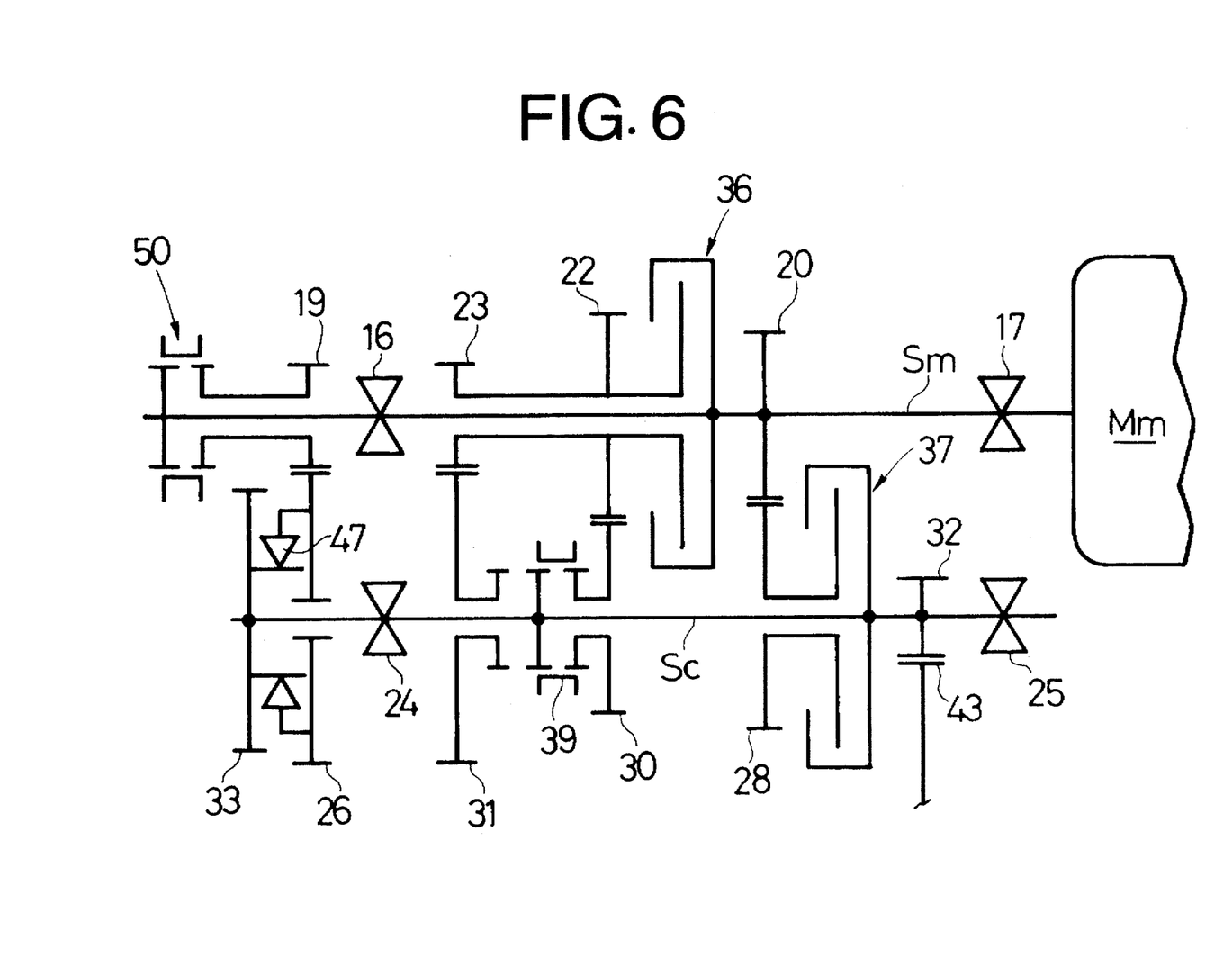
FIG. 6 is a skeleton diagram corresponding to FIG. 1.

Except when the vehicle is towed backwardly, the slide piece 55 of the towing clutch 50 is in the position shifted to the right, as shown in FIGS. 5 and 6, to put the main first-shift gear 19 into fixed engagement with the main shaft Sm. When the shift stage of the transmission T is at a first shift, the second-shift clutch 37 is in a disengaged state, so that the counter second-shift gear 28 is not in engagement with the counter shaft Sc, and the third-shift reverse clutch 36 is in a disengaged state, so that the main third-shift gear 22 and the main reverse gear 23 are not in engagement with the main shaft Sm. Further, the shift piece 39 is in the position shifted to the right, as shown in FIGS. 3 and 6, so that the counter third-shift gear 30 is in fixed engagement with the counter shaft Sc.

When the main motor Mm is driven in a normal direction in this condition, the rotation of the output shaft 9 of the main motor Mm is transmitted through the damper 15 to the main shaft Sm of the transmission T; then from the main shaft Sm through main first-shift gear 19, the counter first-shift gear 26, the one-way clutch 47 and the parking gear 33 to the counter shaft Sc; and further from the counter shaft Sc through the final drive gear 32, the final driven gear 43 and the differential D to the left and right axles 4, 4.

Figure 7A:
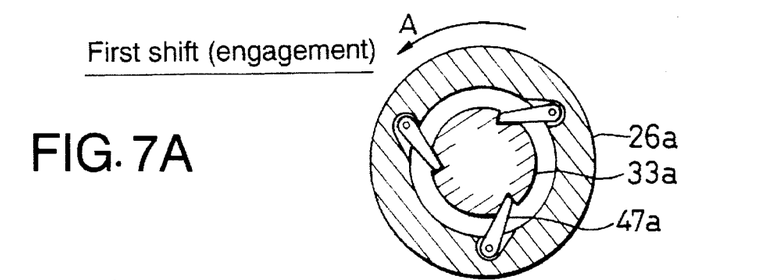
FIGS. 7A to 7E are diagrams for explaining the operation of a one-way clutch in the transmission of FIG. 1.

At this time, the one-way clutch 47 is brought into an engaged state by rotation of an outer member 26a integral with the counter first-shift gear 26 in the direction of arrow A, as shown in FIG. 7A, whereby an inner member 33a integral with parking gear 33 that is coupled to the counter shaft Sc is rotated in the same direction as the direction of the arrow A by, for example, levers 47a.

When the second-shift clutch 37 is brought into an engaged state from this condition, the counter second-shift gear 28 is brought into fixed engagement with the counter shaft Sc to establish a second shift stage, so that the rotation of the main shaft Sm is transmitted through the main second-shift gear 20 and the counter second-shift gear 28 to the counter shaft Sc.

Figure 7B:
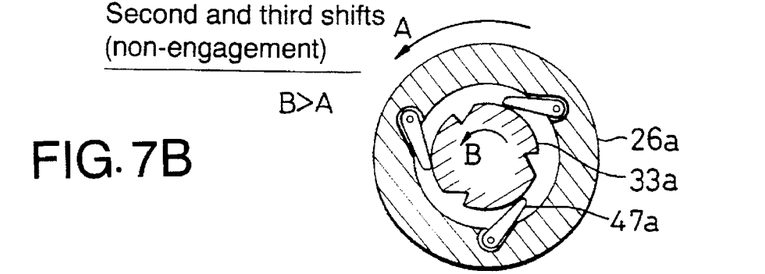

At this time, the inner member 26a of the one-way clutch 47 is rotated in the direction of arrow B by the main second-shift gear 20 and the counter second-shift gear 28, as shown in FIG. 7B, and the outer member 33a continues to be rotated in the direction of arrow A by the main first-shift gear 19 and the counter first-shift gear 26. However, the number of rotations per minute of the inner member is more than the number of rotations per minute of the outer member because of the difference in reduction ratio between first and second shift stages, so that the one-way clutch 47 is brought into its non-engaged state.

Further, when the second-shift clutch 37 is brought into its disengaged state, and the third-shift reverse clutch 36 is brought in its engaged state, the main third-shift gear 22 is brought into fixed engagement with the main shaft Sm to establish a third shift state, so that the rotation of the main shaft Sm is transmitted through the main third-shift gear 22 and the counter third-shift gear 30 to the counter shaft Sc. Even at this time, the one-way clutch 47 is in its non-engaged state by the action shown in FIG. 7B.

On the other hand, when the shift piece 39 is driven leftwardly to bring the counter reverse gear 31 into fixed engagement with the counter shaft Sc, and the third-shift reverse clutch 36 is brought into its engaged state to bring the main reverse gear 23 into fixed engagement with the main shaft Sm, a reverse shift stage is established. When the main motor Mm is reversely rotated in this condition, the rotation of the main shaft Sm is transmitted through the main reverse gear 23 and the counter reverse gear 31 to the counter shaft Sc to move the vehicle backwardly.

Figure 7C:
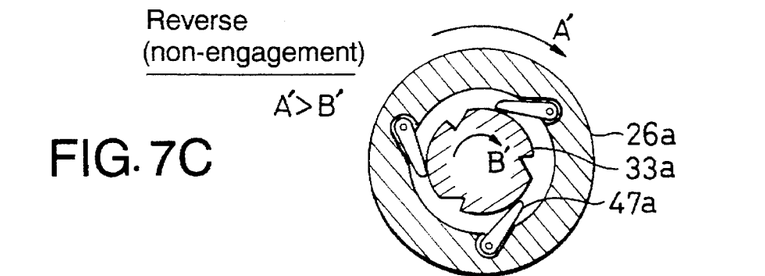

At this time, the inner member 33a of the one-way clutch 47 is rotated in the direction of arrow B' by the main reverse gear 23 and the counter reverse gear 31, and the outer member 26a is rotated in the direction of arrow A' by the main first-shift gear 19 and the counter first-shift gear 26, as shown in FIG. 7C. However, the number of rotations per minute of the outer member is more than the number of rotations per minute of the inner member because of a difference in reduction ratio between the first and reverse shift stages, so that the one-way clutch 47 is brought into the non-engaged state.

Figure 7D:
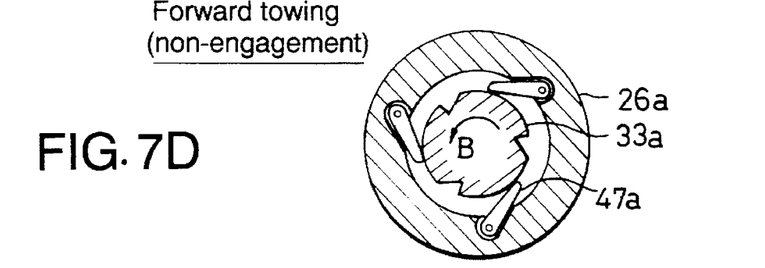
Figure 7E:
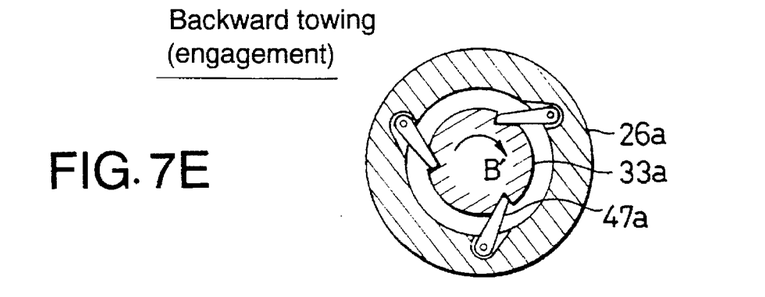

Now, when the vehicle is towed forwardly, the inner member is rotated in the direction of the arrow B by a driving force transmitted from the left and right axles 4,4, so that the one-way clutch 47 is brought into its non-engaged state, as shown in FIG. 7D. However, when the vehicle is towed backwardly, the inner member is rotated in the direction of the arrow B', as shown in FIG. 7E, so that the one-way clutch 47 is brought into its engaged state. When the one-way clutch 47 is brought into its engaged state in this manner, there is a possibility that the main motor Mm may be forcibly rotated and as a result, may be damaged.

Therefore, when the vehicle is towed backwardly, the towing clutch 50 is manually actuated to rotate the cam member 51, whereby the clutch rod 53is moved along the cam face $51_1$ by the resilient force of the spring 52 as the cam member 51 rotates (see FIG. 5). This causes the clutch fork 54 to move the slide piece 55 leftwardly to release the engagement of the main first-shift gear 19 with the main shaft Sm. Thus, even when the one-way clutch 47 is brought into its engaged state during backward towing of the vehicle to cause rotation of the main first-shift gear 19, such rotation cannot be transmitted to the main shaft Sm and the main motor Mm, thus eliminating the above-described disadvantage.

No hydraulic clutch is mounted at the first shift stage and hence, even when the hydraulic system fails, or even when the hydraulic pump stop upon stopping the vehicle without the provision of the assist motor Ma, the starting forward motion of the vehicle in the first gear shift state can be performed without hindrance.

Further, since the transmission T in this embodiment includes the one-way clutch 47 incorporated in the first-shift state, the first shift state cannot be also used as the reverse shift stage by reversing the main motor Mm, but the backward movement of the vehicle can be performed without hindrance by the provision of the reverse shift stage independent from the first shift stage.

Although the embodiment of the present invention has been described in detail, it will be understood that the present invention is not limited to the above-described embodiment, and various modifications in design may be made without departing from the spirit and scope of the invention defined in claims.

For example, the one-way clutch 47 has been mounted on the counter shaft Sc in the embodiment, but may be mounted on the main shaft Sm. In this case, in place of disengaging the maim first-shift gear 19 from the main shaft Sm by the towing clutch 50, the counter first-shift gear 26 may be disengaged from the main shaft Sm. Thus, the one-way clutch 47 may be disposed on either the main shaft Sm or the counter shaft Sc, and the towing clutch 50 may be disposed on the other of the main shaft Sm and the counter shaft Sc, whereby the one-way clutch 47 and the towing clutch 50 can be disposed in a compact manner without any interference with each other.

What is claimed is:

1. A transmission for an electric vehicle, comprising, a one-way clutch for being brought into an engaged state to establish a starting shift stage in a power transmitting path between an input shaft and an output shaft in order to transmit a driving force from a reversible electric motor to a vehicle driven wheel through a preselected shift stage established in said power transmitting path; and a shifting clutch capable of being brought into an engaged state to establish a shift stage other than said starting shift stage, wherein said transmission further includes a clutch means provided in said power transmitting path for disengaging at least one gear of said starting shift stage from one of said input shaft and said output shaft during backward towing of the vehicle.

2. A transmission for an electric vehicle according to claim 1, further including a backward shift stage mounted in another shift stage independently from said starting shift stage.

3. A transmission for an electric vehicle according to claim 1, further including: a driving gear for said starting shift stage, which driving gear is relatively rotatably carried on said input shaft; and a follower gear for the starting shift stage, which follower gear is relatively rotatably carried on said output shaft and which is meshed with said driving gear; wherein one of said clutch means and said one-way clutch is disposed between said input shaft and said driving gear, and the other of said clutch means and said one-way clutch is disposed between said output shaft and said follower gear.

4. A transmission for an electric vehicle having a reversible electric motor for driving the vehicle in forward and reverse directions, an improvement comprising, a forward starting shift stage having a driving gear on an input shaft of the transmission and a follower gear on an output shaft of the transmission to transmit a vehicle driving force from the reversible electric motor;

a one-way clutch in said forward starting shift stage; and a clutch means provided in said forward starting shift stage for disengaging one of said gears from one of said input shaft and said output shaft during backward towing of the vehicle.

5. A transmission for an electric vehicle according to claim 4, further including a backward shift stage for the reverse direction vehicle movement, said backward shift stage being independent of said starting shift stage.

6. A transmission for an electric vehicle according to claim 5, wherein said backward shift stage includes a separate clutch means for establishing said backward shift stage separate from said forward starting shift stage.

7. A transmission for an electric vehicle according to claim 5, wherein said backward shift stage has a higher gear ratio than said forward starting shift stage for causing disengagement of said one-way clutch while said backward shift stage is engaged for reverse vehicle movement.

8. A transmission for an electric vehicle, comprising, a one-way clutch for being brought into an engaged state to establish a starting shift stage in a power transmitting path between an input shaft and an output shaft in order to transmit a driving force from a reversible electric motor to a vehicle driven wheel through a preselected shift stage established in said power transmitting path;

a shifting clutch capable of being brought into an engaged state to establish a shift stage other than said starting shift stage; and a backward shift stage mounted in another shift stage independently from said starting shift stage; wherein said transmission further includes a clutch means provided in said power transmitting path for disengaging at least one gear of said starting shift stage from one of said input shaft and said output shaft.

9. A transmission for art electric vehicle according to claim 8, further including: a driving gear for said starting shift stage, which driving gear is relatively rotatably carried on said input shaft; and a follower bear for the starting shift stage, which follower gear is relatively rotatably carried on said output shaft and which is meshed with said driving gear; wherein one of said clutch means and said one-way clutch is disposed between said input shaft and said driving gear, and the other of said clutch means and said one-way clutch is disposed between said output shaft and said follower gear.

10. A transmission for an electric vehicle, comprising, a one-way clutch for being brought into an engaged state to establish a starting shift stage in a power transmitting path between an input shaft and an output shaft in order to transmit a driving force from a reversible electric motor to a vehicle driven wheel through a preselected shift stage established in said power transmitting path; and a shifting clutch capable of being brought into an engaged state to establish a shift stage other than said starting shift stage;

a clutch means provided in said power transmitting path of said transmission for disengaging at least one gear of said starting shift stage from one of said input shaft and said output shaft; and a driving gear for said starting shift stage, which driving gear is relatively rotatably carried on said input shaft; and a follower gear for the starting shift stage, which follower gear is relatively rotatably carried on said output shaft and which is meshed with said driving gear; wherein one of said clutch means and said one-way clutch is disposed between said input shaft and said driving gear, and the other of said clutch means and said one-way clutch is disposed between said output shaft and said follow gear.

11. A transmission for an electric vehicle having a reversible electric motor for driving the vehicle in forward and reverse directions, an improvement comprising, a forward starting shift stage having a driving gear on an input shaft of the transmission and a follower gear on an output shaft of the transmission to transmit a vehicle driving force from the reversible electric motor;

a one-way clutch in said forward starting shift stage;

a clutch means provided in said forward starting shift stage for disengaging one of said gears from one of said input shaft and said output shaft; and a backward shift stage for the reverse direction vehicle movement, said backward shift stage being independent of said starting shift stage.

12. A transmission for an electric vehicle according to claim 11, wherein said backward shift stage includes a separate clutch means for establishing said backward shift stage separate from said forward starting shift stage.

13. A transmission for an electric vehicle according to claim 11, wherein said backward shift stage has a higher gear ratio than said forward starting shift stage for causing disengagement of said one-way clutch while said backward shift stage is engaged for reverse vehicle movement.

* * * * *

UNITED STATES PATENT AND TRADEMARK OFFICE
CERTIFICATE OF CORRECTION

PATENT NO.    : 5,623,851
DATED         : April 29, 1997
INVENTOR(S)   : Kazuo Ooyama, Masahiro Imamura and Makoto Kojima It is certified that error appears in the above-identified patent and that said Letters Patent is hereby corrected as shown below:

Column 7,
Line 20, delete the word "art" and substitute -- an --.
Line 23, delete the word "bear" and substitute -- gear --.

Signed and Sealed this

Seventh Day of May, 2002

Attest:

JAMES E. ROGAN
*Attesting Officer*    *Director of the United States Patent and Trademark Office*